US012639328B2

(12) United States Patent
Gupta et al.

(10) Patent No.: US 12,639,328 B2
(45) Date of Patent: May 26, 2026

(54) ENTERPRISE INFORMATION ITEM LOCATION AND MANAGEMENT SYSTEMS

(71) Applicant: Teachers Insurance and Annuity Association of America, New York, NY (US)

(72) Inventors: Deepak Gupta, Pune (IN); Mathew George, Kochi (IN); Anchit Pancholi, Pune (IN)

(73) Assignee: Teachers Insurance and Annuity Association of America, New York, NY (US)

( * ) Notice: Subject to any disclaimer, the term of this patent is extended or adjusted under 35 U.S.C. 154(b) by 31 days.

(21) Appl. No.: 18/597,452

(22) Filed: Mar. 6, 2024

(65) Prior Publication Data

US 2025/0284702 A1 Sep. 11, 2025

(51) Int. Cl.
*G06F 16/25* (2019.01)

(52) U.S. Cl.
CPC .......... *G06F 16/254* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 8,402,032 B1 * | 3/2013 | Brunsman | G06F 40/232 |
| | | | 707/711 |
| 2008/0066099 A1 * | 3/2008 | Brodersen | H04N 21/4316 |
| | | | 348/E7.071 |
| 2010/0191748 A1 * | 7/2010 | Martin | G06F 16/334 |
| | | | 707/E17.084 |
| 2020/0073871 A1 * | 3/2020 | Drivflaadt | G06F 16/285 |
| 2021/0019360 A1 * | 1/2021 | Li | G06F 40/169 |

\* cited by examiner

*Primary Examiner* — Yu Zhao

(74) *Attorney, Agent, or Firm* — Lowenstein Sandler LLP

(57) ABSTRACT

A method includes receiving, by a processing device, a metadata rule template for extracting an enterprise information item generated by an enterprise application, causing, by the processing device, the enterprise information item to be extracted in accordance with the metadata rule template, generating, by the processing device, a searchable artifact representing the enterprise information item, wherein the searchable artifact comprises metadata representing a set of keywords, and storing, by the processing device, the searchable artifact within an artifact store.

18 Claims, 9 Drawing Sheets

300A

START

Receive a metadata rule template for extracting at least one enterprise information generated by at least one enterprise application 310A Cause the at least one enterprise information item to be extracted in accordance with the metadata rule template 320A Generate at least one artifact representing the at least one enterprise information item 330A Store the at least one artifact within an artifact store 340A Generate at least one collection 350A

END

300A

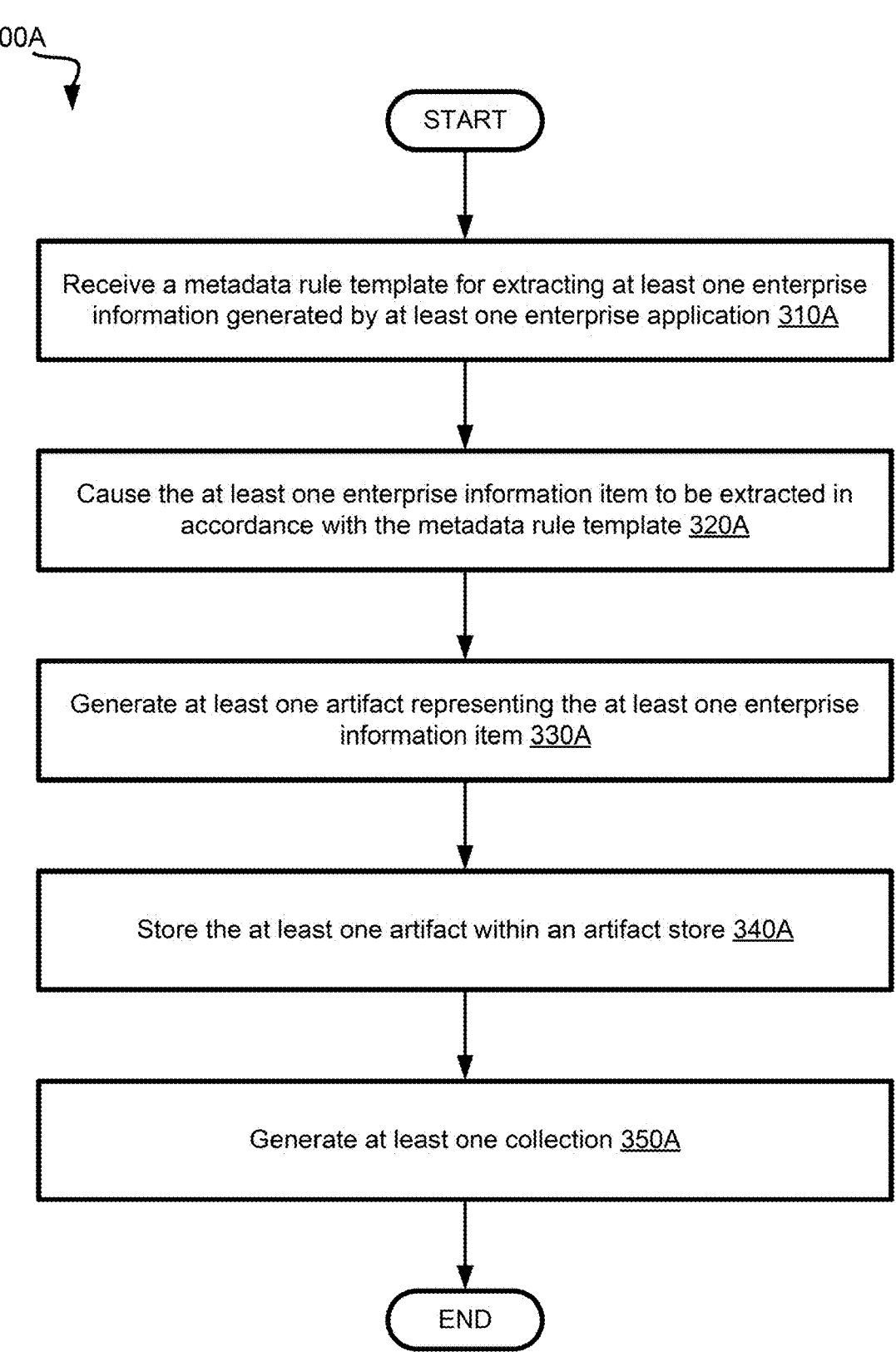

START

Receive a metadata rule template for extracting at least one enterprise information generated by at least one enterprise application 310A Cause the at least one enterprise information item to be extracted in accordance with the metadata rule template 320A Generate at least one artifact representing the at least one enterprise information item 330A Store the at least one artifact within an artifact store 340A Generate at least one collection 350A

END

ENTERPRISE INFORMATION ITEM LOCATION AND MANAGEMENT SYSTEMS

TECHNICAL FIELD

Implementations of the disclosure relate generally to enterprise networks, and more specifically, relate to enterprise information item location and management systems for locating and managing enterprise information items found across multiple enterprise applications.

BACKGROUND

A computing environment can include multiple devices communicatively coupled via a network. The network can include one or more of: a local area network (LAN) to connect devices within a limited region (e.g., a building), a wide area network (WAN) to connect devices across multiple regions (e.g., using multiple LANs), etc. For example, a computing environment can include an enterprise network. An enterprise network can include multiple devices communicably coupled by a private network owned and/or controlled by an enterprise (e.g., organization). An enterprise network can include an on-premises subnetwork in which software is installed and executed on computers on the premises of the enterprise using the software. Additionally or alternatively, an enterprise network can include a remote subnetwork (e.g., cloud subnetwork) in which software is installed and executed on remote devices (e.g., server farm). The enterprise network can be used to facilitate access to data and/or data analytics among devices of the private network. Examples of devices of an enterprise network can include client devices (e.g., user workstations), servers (e.g., web servers, email servers, high performance computing (HPC) servers, database servers and/or virtual private network (VPN) servers), etc.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 3A is a flow diagram of an example method to generate searchable artifacts within an enterprise network, in accordance with some implementations of the present disclosure.

DETAILED DESCRIPTION

Figure 1A:
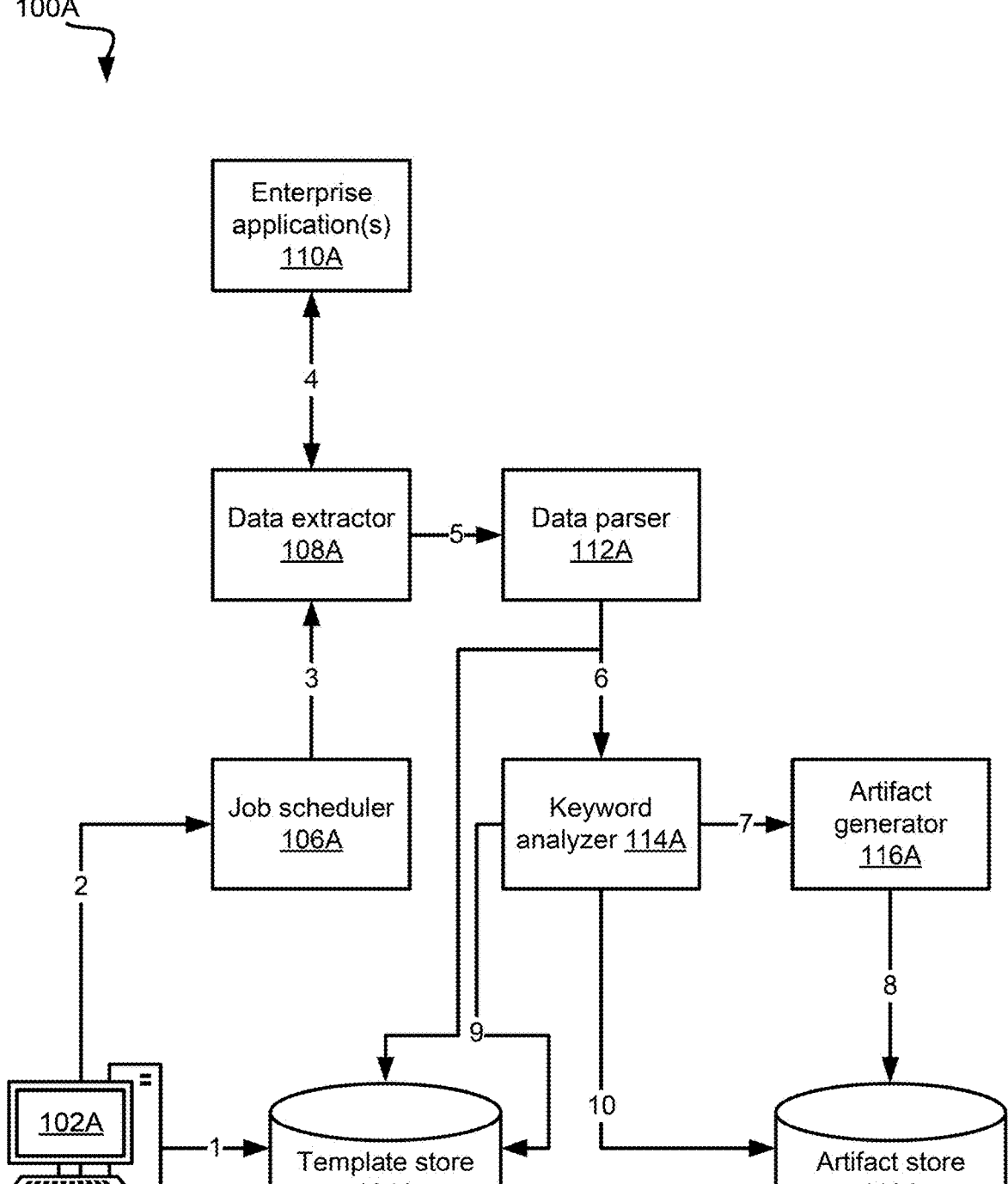
FIG. 1A is a diagram of example an example system for generating searchable artifacts within an enterprise network, in accordance with some implementations of the present disclosure.

Aspects of the present disclosure are directed to systems for locating and managing enterprise information items within an enterprise network. An enterprise network of an enterprise (e.g., organization) can include many information technology (IT) components that operate to manage information (e.g., data) within the enterprise network. An enterprise information item refers to an item of information (data) that is generated and/or stored by an IT component as an enterprise information item source. Examples of IT components include domains, applications, systems, configurations, applications, servers (e.g., local servers and/or cloud servers), databases, etc. Some examples of enterprise information items include electronic reports generated by reporting applications of the enterprise network, electronic documents related to policies, guides, electronic operations and/or training manuals (e.g., runbooks), enterprise network applications, enterprise information item generated by enterprise network applications, etc. Enterprise information items can be shared by multiple reporting and documentation applications/systems within an enterprise network.

It can be difficult to locate and/or manage enterprise information items generated and/or stored by enterprise information item sources. For example, it can be difficult to identify and/or quickly find relevant enterprise information items maintained within an enterprise network for a particular purpose, determine the authenticity of an enterprise information item (e.g., whether the enterprise information item is generated or maintained by an authorized enterprise information item source), determine the latest version of an enterprise information item, determine the ownership of an enterprise information item (e.g., which group within the enterprise owns or is responsible for a particular enterprise information item), etc. The segmentation of enterprise information items among different users or groups within the enterprise network (e.g., enterprise information item hiding) can make it difficult for a user or group within the enterprise network to efficiently locate enterprise information items in possession of another user or group within the enterprise network, unless the other user or the other group of users shares the enterprise information item.

However, it can be technically challenging to efficiently share enterprise information items across an enterprise network. For example, sharing an enterprise information item across the enterprise network to one or more user devices via a messaging modality (email, instant messaging, etc.) can be ineffective as users become inundated with messages. An enterprise network may not support classification and/or categorization of all available enterprise information items. Additionally, ensuring that a new member of a group within an enterprise network has access to relevant enterprise information items for the group can be technically challenging.

Some enterprise networks have attempted to solve at least some of the above-noted technical challenges by employing catalog applications that can organize enterprise information items in a way to enable users within an enterprise network to identify and manage enterprise information items. However, these features can require configuration of the enterprise information item sources within the enterprise network. Moreover, some catalog applications can be restricted to a particular type of enterprise information item source, and can be inflexible with respect to integration across multiple IT components of the enterprise network.

Aspects of the present disclosure address the above and other deficiencies by implementing enterprise information item location and management systems that can be used to efficiently locate and manage enterprise information item across multiple IT components of an enterprise network. A system described herein can include an artifact generation subsystem that can generate searchable artifacts ("artifacts") based on enterprise information items extracted from respective enterprise information item sources (e.g., at least one enterprise application or at least one source external to the enterprise application). An artifact is a representation of an enterprise information item that summarizes the particular enterprise information item. The purpose of the artifact is to make the enterprise information item more easily accessible by end users. In some implementations, an artifact includes a title and the description for the particular enterprise information item. For example, an artifact can include an information card (info card). A system described herein can further support the creation of collections of artifacts that can be made accessible to one or more users and/or one or more groups of users of an enterprise network. Further details regarding artifact generation, searching and collection generation will be described in further detail below with reference to FIGS. 1-6.

Advantages of the present disclosure include, but are not limited to, improved computer system performance and QoS. For example, implementations described herein can improve the ability of a computer system to search for enterprise information item having various data formats in response to search queries.

FIG. 1A illustrates an example computer system ("system") 100A for generating searchable artifacts ("artifacts") within an enterprise network, in accordance with some implementations of the present disclosure. System 100A can include at least one user device 102A which may be operable by at least one user. For example, user device 102A can be an administrator device operable by at least one system administrator. User device 102A can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

User device 102A can execute a web browser ("browser"). A browser refers to any suitable software application for retrieving, presenting and navigating through enterprise information items (e.g., electronic documents). An enterprise information item may be provided by a web application. A web application refers to a software application having a client part that is designed to run in a web browser. The client part may be created in a browser-supported programming language (such as JavaScript, Hypertext Markup Language (HTML), or their combination) and thus may rely on a web browser to render its output and/or receive graphical user interface (GUI)-based user input. Application performance metrics of software applications being executed by distributed computer systems may utilize various client-side enterprise information items, including parameters of the browser, parameters of applications being executed within the browser, and/or parameters of the current session of the browser. User-side application performance metrics may include various end user experience (EUE) metrics, such as the number of requests issued by user device 102 within a given time period, the request processing time (e.g., measured as the page load time), and/or the number of errors received in response to the user requests. User-side application performance metrics may further include various metrics related to usage levels of user-side computing items by a software application, such as the processor usage level of user device 102A, the amount of memory used by the application user device 102A, and/or the amount of data transferred by the application over the network as measured by user device 102A.

As will be described in further detail below, user device 102A can cause an enterprise information item to be located, which can be used to generate an artifact representing the enterprise information item. The artifact can be stored and/or shared with other user devices of system 100A to increase accessibility of enterprise information items within the enterprise network. User device 102A, in addition to having the user functionality described above and below, can have some extended rights to carry out various administrator tasks. For example, user device 102A can have rights to modify an enterprise information item created/discovered for/by user device 102A. User device 102A can also control data access and authorization.

For example, user device 102A can provide (e.g., generate) a template of a metadata rule ("metadata rule template"). In some implementations, the metadata rule template is included in a configuration file. The metadata rule template can define a set of rules for processing metadata pertaining to a particular enterprise information item within system 100A. A metadata rule template can be used to customize the how system 100A processes metadata to adhere to enterprise requirements, industry standards, and/or regulatory compliance needs. Accordingly, a metadata rule template can provide a flexible and configurable mechanism for defining how metadata is handled within system 100A for various use cases.

In some implementations, a metadata rule template specifies various parameters pertaining to an enterprise information item. Examples of parameters pertaining to an enterprise information item include an identifier of the enterprise information item, an identifier of where to locate the enterprise information item within system 100A, an identifier of how to locate the enterprise information item within system 100A, etc.

For example, the metadata rule template can include a keyword section. The keyword section can include a set of keywords relating to the enterprise information item. Illustratively, if the enterprise information item is related to a travel expense for a cab ride taken during a business trip, then the set of keywords can include "Travel", "Cab" and "Business trip".

As another example, the metadata rule template can further include a data sources section identifying a set of data sources relating to the enterprise information item. The set of data sources can include one or more data sources. For example, the set of data sources can include an array of multiple data sources. Each data source of the set of data sources can be defined by a set of data source fields. For example, the set of data source fields can include a source type field, a source field, a protocol field, and a set of search locations (e.g., a search location array).

The source type field can identify the type of data source of the enterprise information item. Examples of types of data sources that can be identified by a source type field include policy, guide, application, dashboard, etc. For example, the policy type can indicate that the enterprise information item from the data source pertains to policies. The guide type can indicate that the enterprise information item from the data source provides instructions or explanations of how to use a particular system feature. The application type can indicate a particular application that created the enterprise information item. The dashboard type can indicate that the enterprise information item originates from a dashboard application (e.g., an application that generates visual representations of data for presentation via graphical user interfaces (GUIs)).

The source field identifies the name of a source of the enterprise information item within the enterprise. For example, the source of enterprise information can be an enterprise application of set of enterprise applications 110A. An enterprise application refers to an application that includes functionality to generate, retrieve, process and/or use enterprise information items. Examples of enterprise applications include data storage applications, data organization applications, data visualization applications, file transferring applications, enterprise collaboration applications, expense management applications, travel management applications, vendor invoice management applications, etc.

The protocol field identifies a communication protocol that is used to communicate the enterprise information item within the enterprise. In some implementations, a communication protocol identified by a protocol filed is an application layer protocol. Examples of application layer protocols that can be identified by the protocol field include HTTP (Hypertext Transfer Protocol), HTTPS (Hypertext Transfer Protocol Secure), SOAP (Simple Object Access Protocol), SMTP (Simple Mail Transfer Protocol), FTP (File Transfer Protocol), etc.

The set of search locations specifies one or more search locations within the source of the enterprise information item where the enterprise information item can be located by system 100A. Each search location of the set of search locations can be defined by a set of search location fields. For example, a set of search location fields can include a location field that identifies the search location within the source to locate the enterprise information item (e.g., a directory or file path). As another example, the set of search location fields can further include an extension field identifying any file extensions that may be considered when locating the enterprise information item within the search location.

As indicated by arrow "1", user device 102A can store the metadata rule template in metadata rule template ("template") store 104A. For example, template store 104A can be implemented as a database.

As indicated by arrow "2", user device 102A can provide the metadata rule template to job scheduler 106A to execute a data fetching job. Job scheduler 106A is a system or application that automates the scheduling and execution of jobs, which can include tasks such as file transfers or data processing.

More specifically, as indicated by arrow "3", the execution of the data fetching job can cause data extractor 108A to extract a raw enterprise information item from at least one enterprise application of set of enterprise applications 110A, as indicated by arrow "4". The parameters of the raw enterprise information item extraction can be defined by the metadata rule template. If enterprise information item is located within the enterprise application of set of enterprise applications 110A, then the enterprise application of set of enterprise applications 110A can return the raw enterprise information item to data extractor 108A.

A raw enterprise information item can be stored in any one of a variety of data formats, which can be dependent at least in part on the source of the enterprise information item (e.g., enterprise application). Examples of data formats include XML (extensible Markup Language), JSON (JavaScript Object Notation), TXT (Text Document), CSV (Comma-Separated Value), YAML (YAML Ain't Markup Language), SQL (Structured Query Language), etc.

To address the non-uniformity of data formats of raw enterprise information items found within various different sources of system 100A, as indicated by arrow "5", any raw enterprise information item received by data extractor 108A can be sent to data parser 112A to generate enterprise information item by converting an initial data format of the raw enterprise information item received from data extractor 108A into a predefined data format suitable for searching. More specifically, data parser 112A can arrange the raw enterprise information item received from data extractor 108A in a predefined data format (e.g., unified data format) specified by system 100A. Illustratively, the predefined data format can be JSON. However, such an example should not be considered limiting. Accordingly, using data parser 112A to convert the initial data format into the predefined data format can improve the ability of system 100A to locate relevant enterprise information item(s), and can enable support of enterprise information items having various data formats. Further details regarding data parser 112A will be described below with reference to FIG. 1B.

As indicated by arrow "6", the enterprise information item (e.g., having the predefined format) can be sent to keyword analyzer 114A. Keyword analyzer 114A can identify a set of keywords from the enterprise information. In some implementations, the set of keywords includes keywords referenced by (e.g., linked to) the metadata rule template. More specifically, the set of keywords can include one or more keywords identified in the keyword section of the metadata rule template.

Additionally or alternatively, the set of keywords can include a set of most frequently used keywords identified by keyword analyzer 114A from a raw enterprise information item using natural language processing (NLP) techniques. For example, keyword analyzer 114A can read raw text data from the enterprise application, identify a set of keywords within the raw text data, and determine, from the set of keywords, the set of most frequently used keywords within the raw text data. In some implementations, identifying the set of keywords includes tokenizing the raw text data to generate at least one token (e.g., word or phrase). In some implementations, identifying the set of keywords can further include transforming the token to have a standardized format. Transforming the token can include performing normalization by, e.g., converting a token to its lowercase form, removing punctuation, reducing a token to a root form (e.g., stemming). Additionally or alternatively, transforming the token can include removing at least one stopword. A stopword is a common word that does not contribute to the meaning of the search query. Examples of stopwords include articles (e.g., "a," "an," "the"), prepositions.

The set of most frequently used keywords can include the top N keywords of the set of keywords. In some implementations, the set of most frequently words includes five words (N=5). In some implementations, the set of words is identified from the raw text data by using a rapid automatic keyword extraction (RAKE) method to extract the set of words from the raw text data. In some implementations, a word cloud, also referred to as a tag cloud, is generated using a word cloud generator. The word cloud graphically represents a frequency of each keyword of the set of keywords. For example, for each keyword, at least one feature of the visual representation of the keywords (e.g., font, size, color) can be chosen to represent the frequency that the keyword is used in the raw text data. In some implementations, a transformer model may be used to summarize the raw text data and an NLP model is used to identify the set of keywords and determine the set of most frequency used keywords. For example, the NLP model can include a transformer model to summarize the raw text data and/or a bidirectional encoder representations from transformers (BERT) model to identify keywords.

As indicated by arrow "7", the set of keywords identified by keyword analyzer 114A can be sent to artifact generator 116A to create an artifact (e.g., info card) for the enterprise information item. The artifact can include multiple components, such as a title, and short description generated based on a set of tags. For example, the set of tags can include the keywords from the metadata rule template and/or the keywords identified by keyword analyzer 114A. As indicated by arrow "8", the artifact generated by artifact generator 116A can be stored in artifact store 118A (e.g., database).

An artifact can be generated having a predefined artifact design template (e.g., info card template). Information contained within the artifact, such as the title and short description, can be organized and presented within the design template in any suitable manner. The artifact can include visual elements that can complement the enterprise information item being summarized by the artifact. In some implementations, the artifact is defined by a content structure including a set of elements (e.g., HTML elements). For example, the body can include a heading defining the title, and a list including list item elements each defining a respective keyword. The list can be an ordered list or an unordered list. In some implementations, styles can be applied to the HTML elements to define the visual appearance of the artifact (e.g., using Cascading Style Sheets (CSS)). Examples of styles include typography, colors, spacing, borders, etc.

In some implementations, as indicated by arrow "9", keyword analyzer 114A can link, based on the set of keywords identified for the enterprise information item, the corresponding metadata rule template to one or more other metadata rule templates within template store 104A. For example, if the set of keywords identified for the enterprise information item includes the word "travel", then the corresponding metadata rule template may be linked to one or more other metadata rule templates within template store 104A that identify the keyword "travel".

For example, keyword analyzer 114A can cause an NLP to be used to generate a description of an artifact. The description of the artifact can be used to add metadata tags to the artifact. Illustratively, when creating an artifact for a travel and expense management enterprise application that automates processes related to travel and expense management for the enterprise, keywords like "travel" and "reimbursement" can be added to an artifact for the travel and expense management enterprise application. Thus, when a user searches for "travel" and "reimbursement" as keywords via user device 102A, the artifact for the travel and expense management enterprise application can be presented on user device 102A, suggesting that the travel and expense management enterprise application may be relevant to the search.

System 100A can support the addition of new enterprise information item by operating in a static mode or a dynamic mode. For example, when operating in the static mode, system 100A can enable users to manually add new enterprise information item. As another example, when operating in the dynamic mode, system 100A can utilize batch jobs to add new enterprise information item without additional user interaction. For example, a batch job can be executed according to a predefined schedule, a contingency (e.g., a threshold condition regarding the availability of computing items), etc. System 100A can be used to validate and/or certify enterprise information item received from various groups of an enterprise in regular intervals. System 100A can enable categorization of artifacts (and thus enterprise information items) as private, public or shared in collections to allow for both personal enterprise information item management and collaboration among different users or groups within the enterprise network. For example, collections can be created that can be shared with users of a group and/or related groups of users.

Figures 1B, 1C:
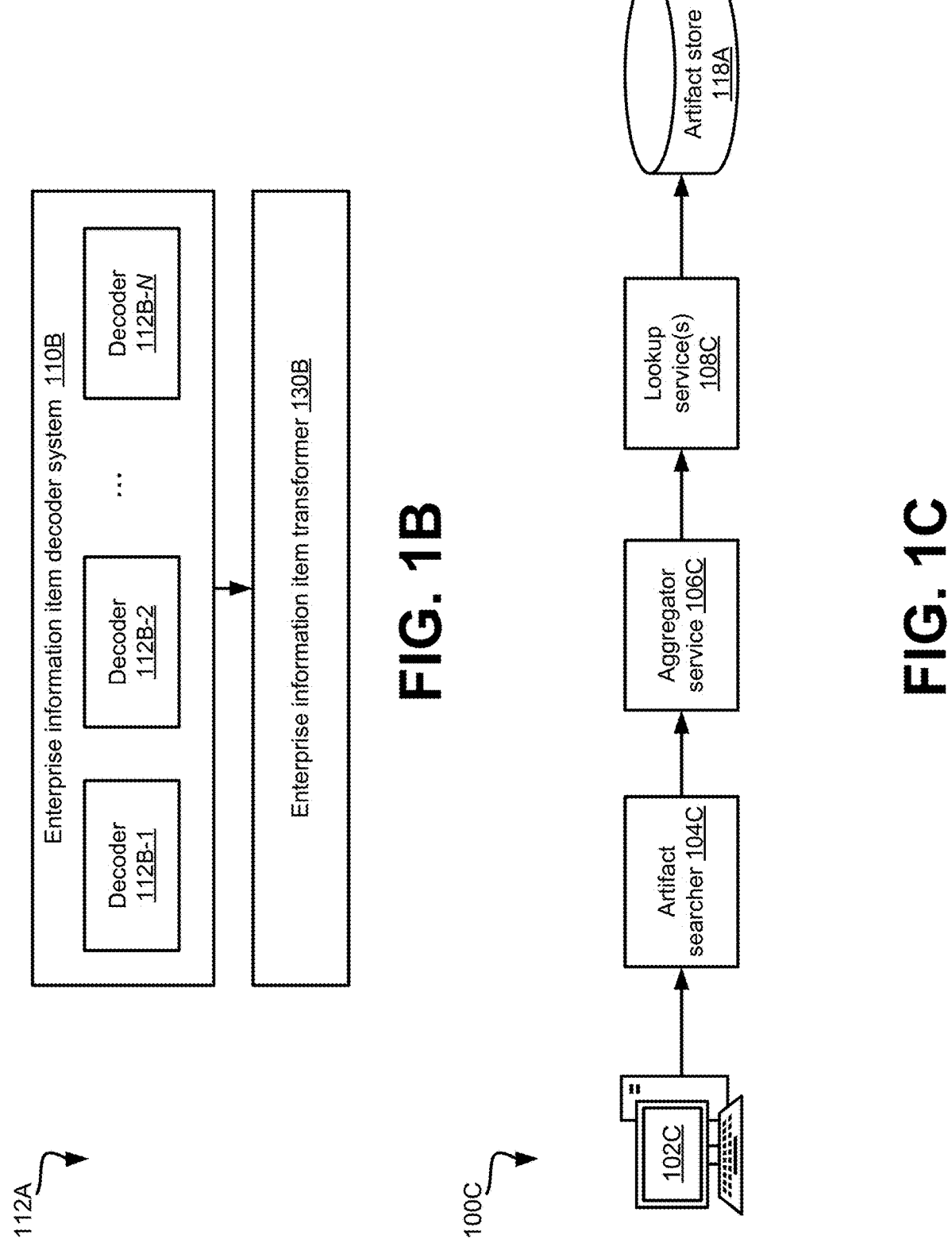
FIG. 1B is a diagram of an example data parser of a system for generating searchable artifacts within an enterprise network, in accordance with some implementations of the present disclosure.
FIG. 1C is a diagram of an example system to search for searchable artifacts within an enterprise network, in accordance with some implementations of the present disclosure.

FIG. 1B is a diagram illustrating an example data parser 112A, in accordance with some implementations of the present disclosure. As shown, data parser 112A can include enterprise information item decoder system 110B. Enterprise information item decoder system 110B can include a set of enterprise information item decoders ("decoders") 112B-1 through 112B-N. Each decoder of set of decoders 112B-1 through 112B-N is configured to decode raw enterprise information item having a respective data format. For example, one decoder of set of decoders 112B-1 through 112B-N can be a SQL data decoder, another decoder of set of decoders 112B-1 through 112B-N can be a JSON data decoder, another decoder of set of decoders 112B-1 through 112B-N can be an XML data decoder, etc. Enterprise information item decoder system 110B can cause a parsing configuration to be retrieved from template store 104A of FIG. 1A. The parsing configuration can define a set of rules specifying how data parser 112A should interpret and process the raw enterprise information item. For example, the parsing configuration can include grammar rules specifying syntactic structure of the raw enterprise information item, tokenization rules for tokenizing the raw enterprise information item, action rules specifying actions to take in response to identifying respective patterns in the raw enterprise information item, error handling rules specifying how unexpected data can be handled (e.g., error reporting) and/or other configuration parameters. The type of parsing configuration retrieved from template store 104A can depend on a variety of factors, such as the data format of the raw enterprise information item, programming language, etc. Data parser 112A can further include enterprise information item transformer 130B that can transform the raw enterprise information item by converting the format of the raw enterprise information item into a predefined format, as described above with reference to FIG. 1A.

FIG. 1C is a diagram illustrating an example computer system ("system") 100C to search for artifacts within an enterprise network, in accordance with some implementations of the present disclosure. As shown, system 100C can include at least one user device 102C (e.g., similar to user device 102A of FIG. 1A), artifact searcher 104C, aggregator service 106C, set of lookup services 108C, and artifact store 118A of FIG. 1A.

Artifact searcher 104C can receive, from user device 102C, a search request for an enterprise information item. The search request can include at least one keyword indicative of the type of content that is being requested by user device 102C. In response to receiving the search request, artifact searcher 104C can generate at least one search. Further details regarding generating the search query are described below. After generating the search query, artifact searcher 104C can then execute the search query. Executing the search query can cause at least one artifact (e.g., info card) to be retrieved from artifact store 118A in accordance with the search query. For example, artifact searcher 104C can be invoked via a representation state transfer application programming interface (REST) API (e.g., RESTful API). Artifact searcher 104C can log search requests and maintain search histories.

In some implementations, set of lookup services 108C includes multiple lookup services. Aggregator service 106C can call the lookup services and aggregate response data from multiple lookup queries. Each lookup service of set of lookup services 108C can perform a respective lookup service for each kind of data in artifact store 118A (and in cache). Examples of lookup services include a name lookup service, a tag (e.g., keyword) lookup service, a link lookup service, a description lookup service, a title lookup service, a collection lookup service, etc.

In some implementations, artifact searcher 104C can generate a search query by parsing the search request to extract at least one keyword. Parsing the search request can include tokenizing the search request to generate at least one token (e.g., word or phrase). Parsing the search request can further include transforming the token to a standardized format. Transforming the token can include performing normalization by, e.g., converting a token to its lowercase form, removing punctuation, reducing a token to a root form (e.g., stemming). Additionally or alternatively, transforming the token can include removing at least one stopword. A stopword is a common word that does not contribute to the meaning of the search query. Examples of stopwords include articles (e.g., "a," "an," "the"), prepositions. In some implementations, artifact searcher 104C can perform a semantic analysis to identify an intent and/or contextual meaning of the keyword.

In some implementations, artifact searcher 104C can expand the token to generate an expanded set of tokens. The expanded set of tokens can be used to capture variations, generalizations and/or synonyms of the keyword. After obtaining the expanded set of tokens, artifact search 104 can construct the search query to have a search syntax capable of being understood by system 100C (e.g., aggregator service 106C, lookup service 108C and/or artifact store 118A). Constructing the search query can include specifying Boolean operators, specifying phrase matching to cause artifacts to be retrieved from artifact store 118A upon execution of the search query based on a specific sequence of keywords, etc. For example, if the search request includes multiple keywords with an indication that that multiple keywords define a specific sequence of keywords (e.g., the keywords are in quotation marks), then artifact searcher 104C can generate the search query to search for that specific sequence of keywords (instead of searching for the keywords individually).

Systems 100A-100C, and more particularly the artifacts generated by systems 100A-100C, can be used to improve efficiency in the management Systems 100A-100C can be used to determine the source of error in case of downtime of a component of systems 100A-100C (e.g., enterprise application). Systems 100A-100C can be used to determine which enterprise information items of the enterprise network are authentic. Systems 100A-100C can be used to determine the latest version of the enterprise information item. Systems 100A-100C can be used to determine whether an enterprise information item is owned by the correct entity or entities within the enterprise. Systems 100A-100C can be used to identify whether an enterprise information item is being retrieved from an authorized source. Systems 100A-100C can be used to quickly find relevant enterprise information items for dashboards, matrices, proposals, meetings, etc. Systems 100A-100C can be used to effectively share an enterprise information item with another entity within an enterprise (e.g., without requiring email communication). Systems 100A-100C can be used to keep track of enterprise information item across an enterprise, such as by locating an enterprise information item that is newly created by various groups within an enterprise.

Figure 2:
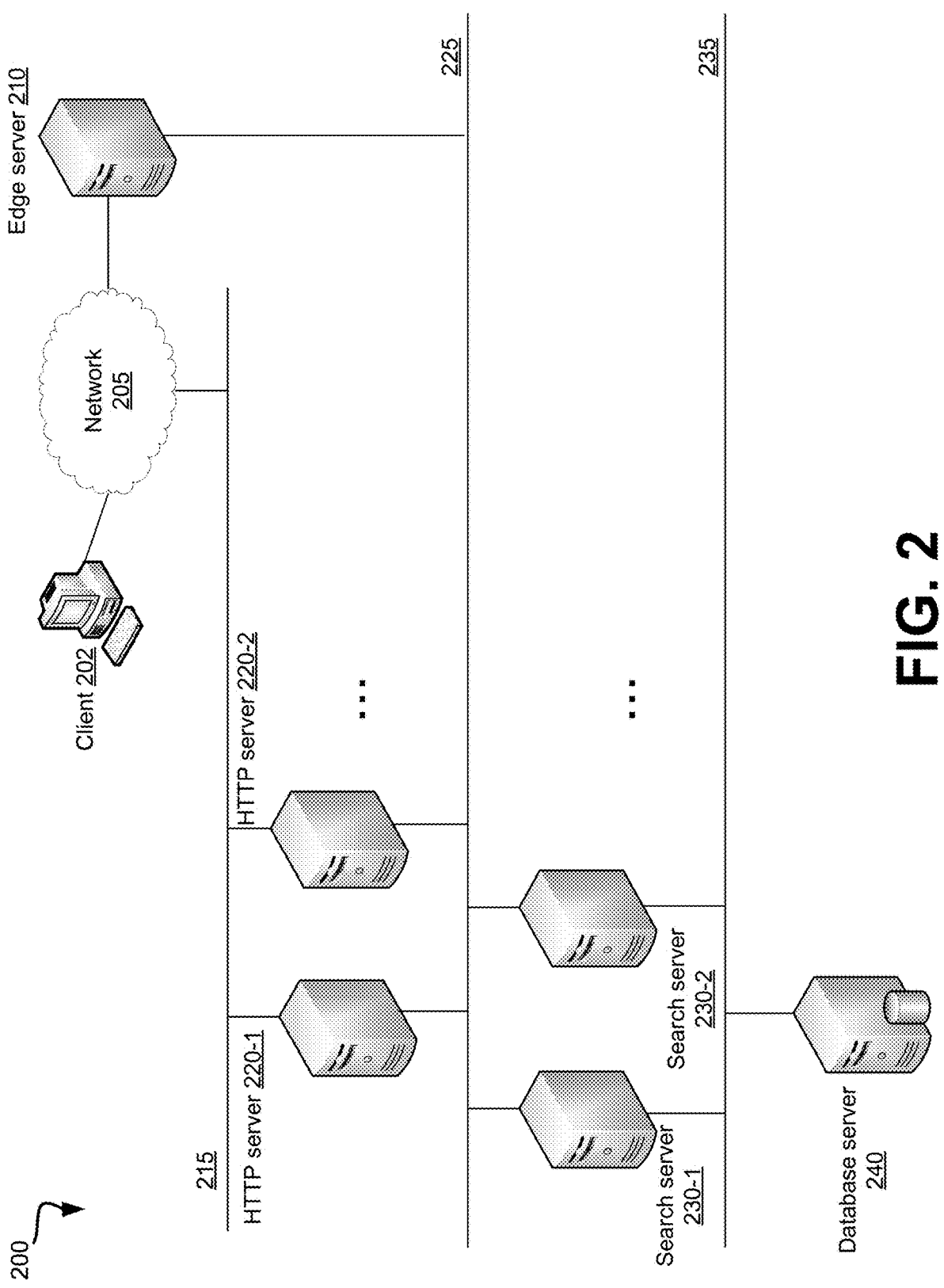
FIG. 2 is a diagram illustrating an example of request processing by an example computer system, in accordance with one or more aspects of the present disclosure.

FIG. 2 schematically illustrates a high-level diagram of an example network 200, in accordance with one or more aspects of the present disclosure. Network 200 can be implemented within a computer system (e.g., enterprise system), such as computer system 100A of FIG. 1. Firewalls, load balancers, network switches and various other components may be omitted from FIG. 2 for clarity. Computer systems, appliances, and network segments are shown in FIG. 2 for illustrative purposes only and do not in any way limit the scope of the present disclosure. Various other computer systems, components, appliances, and/or methods of their interconnection may be compatible with the methods and systems described herein.

In an illustrative example, network 200 includes client device 202 connected to Internet 205, at least one edge server 210 connected to Internet 205, set of HTTP servers including HTTP server 220-1 and HTTP server 220-2 connected to network 215, set of search servers including search server 230-1 and search server 230-2 connected to network 225, and at least one database server 240 connected to network 235. Networks 215, 225 and 235 can include one or more local area networks (LANs) and/or one or more wide area networks (WANs). "Edge server" herein shall refer to a computer system configured to accept incoming requests from a plurality of clients and to either satisfy such requests by returning various locally stored objects (e.g., static content) or forward at least some of the requests to an application server layer for further processing. Examples of edge servers include server-side HTTP proxy servers, HTTP load balancers, content delivery servers, and various other servers. Edge servers may be geographically distributed to reduce the client-server round-trip time at least for static content requests.

For example, HTTP server 220-1 can receive, via network 215, a client request from client device 202. Responsive to receiving the request, HTTP server 220-1 may parse the client request and issue an HTTP server request. Search server 230-1 may receive the HTTP server request and generate a response to be returned to client device 102. The request processing by search server 230-1 can be performed by issuing a search server request to database server 240. HTTP server 220-1 can wrap the response produced by search server 230-1 into an HTTP response message and return the HTTP response message to client device 202.

In certain implementations, the client request can initially be routed to edge server 210, which may then select an HTTP server among the HTTP servers to which the client request should be routed (e.g., HTTP server 220-1). For example, the selection of the HTTP server can be performed based on a load balancing scheme. In an illustrative example, a plurality of edge servers including edge server 210 may be geographically distributed so that the client request initiated by a client device 202 would be routed to an edge server selected from the plurality of edge servers based on the client geographic location and/or other request parameters. The selected edge server (e.g., edge server 210)

may then forward the client request to a dynamically selected HTTP server (e.g., HTTP server 220-1). In addition to performing the load balancing, edge server 210 can serve static content in response to client HTTP requests, and/or perform various other tasks.

FIG. 3A is a flow diagram of an example method 300A to generate artifacts within an enterprise network, in accordance with some implementations of the present disclosure. Method 300A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 300A is performed by system 100A of FIG. 1A. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 310A, processing logic receives a metadata rule template for extracting at least one enterprise information item generated by at least one enterprise application. The metadata rule template can be received from a user device, and the user device can store the metadata rule template within a template store. Further details regarding the metadata rule template are described above with reference to FIG. 1A.

At operation 320A, processing logic causes the at least one enterprise information item to be extracted in accordance with the metadata rule template. In some implementations, an enterprise information item is extracted from an enterprise application. In some implementations, an enterprise information item is extracted from a source external to the enterprise application. For example, the enterprise information item extracted from the enterprise application can include raw enterprise information item. Further details regarding extracting the enterprise information item are described above with reference to FIG. 1A.

At operation 330A, processing logic generates at least one searchable artifact ("artifact") representing the at least one enterprise information item. An artifact can summarize an enterprise information item. For example, an artifact can include a title and short description generated based on a set of tags. In some implementations, generating an artifact includes processing an enterprise information item. For example, processing the enterprise information item can include converting, into a predefined data format, an initial data format of the enterprise information item extracted from the enterprise application. As another example, processing the enterprise information item can include identifying a set of keywords from the enterprise information item. For example, the set of keywords can include keywords identified from the metadata rule template, keywords derived using NLP techniques, etc. As yet another example, processing the enterprise information item can further include linking the metadata rule template to one or more other metadata rule templates within the template store. Further details regarding generating the artifact, including processing the enterprise information item, are described above with reference to FIGS. 1A-1B.

At operation 340A, processing logic stores the at least one artifact within an artifact store. As described above with reference to FIG. 1C and as will now be further described below with reference to FIG. 3B, artifacts stored within the artifact store are searchable in response to search queries received from user devices.

At operation 350A, processing logic generates at least one collection. A collection can be made accessible to one or more users and/or one or more groups of users of an enterprise network. For example, a collection can be a private collection accessible only to the creator of the collection. As another example, a collection can be a public collection that is accessible to all users of an enterprise network. As yet another example, a collection can be a shared collection that is designated to be shared among one or more users and/or one or more groups of users of an enterprise network. Public and/or shared collections can support collaboration among multiple users of an enterprise network.

In some implementations, a collection includes at least one artifact each representing a respective enterprise information item. More specifically, an artifact in the artifact store can be assigned to at least one collection. In some implementations, a collection is generated by using at least one machine learning (ML) model trained to assign an artifact into at least one collection based on input data related to the artifact. For example, the ML model can include a discriminative model (e.g., classifier model) which predicts at least one collection to which the artifact is assigned based on input data related to the artifact (e.g., a set of features). As another example, the ML model can include a generative model (e.g., a transformer model) which generates and/or identifies at least one collection for assigning an artifact based on input data related to the artifact (e.g., a set of features). A ML model described herein can be trained using supervised learning by utilizing a labeled dataset including examples of object features and respective correct outputs corresponding to collections. In some implementations, generating an artifact at operation 330A includes using at least one ML to enrich the artifact with additional metadata. More specifically, the additional metadata can be used to improve the ability of an artifact searcher to locate relevant artifacts from the artifact store.

Figure 3B:
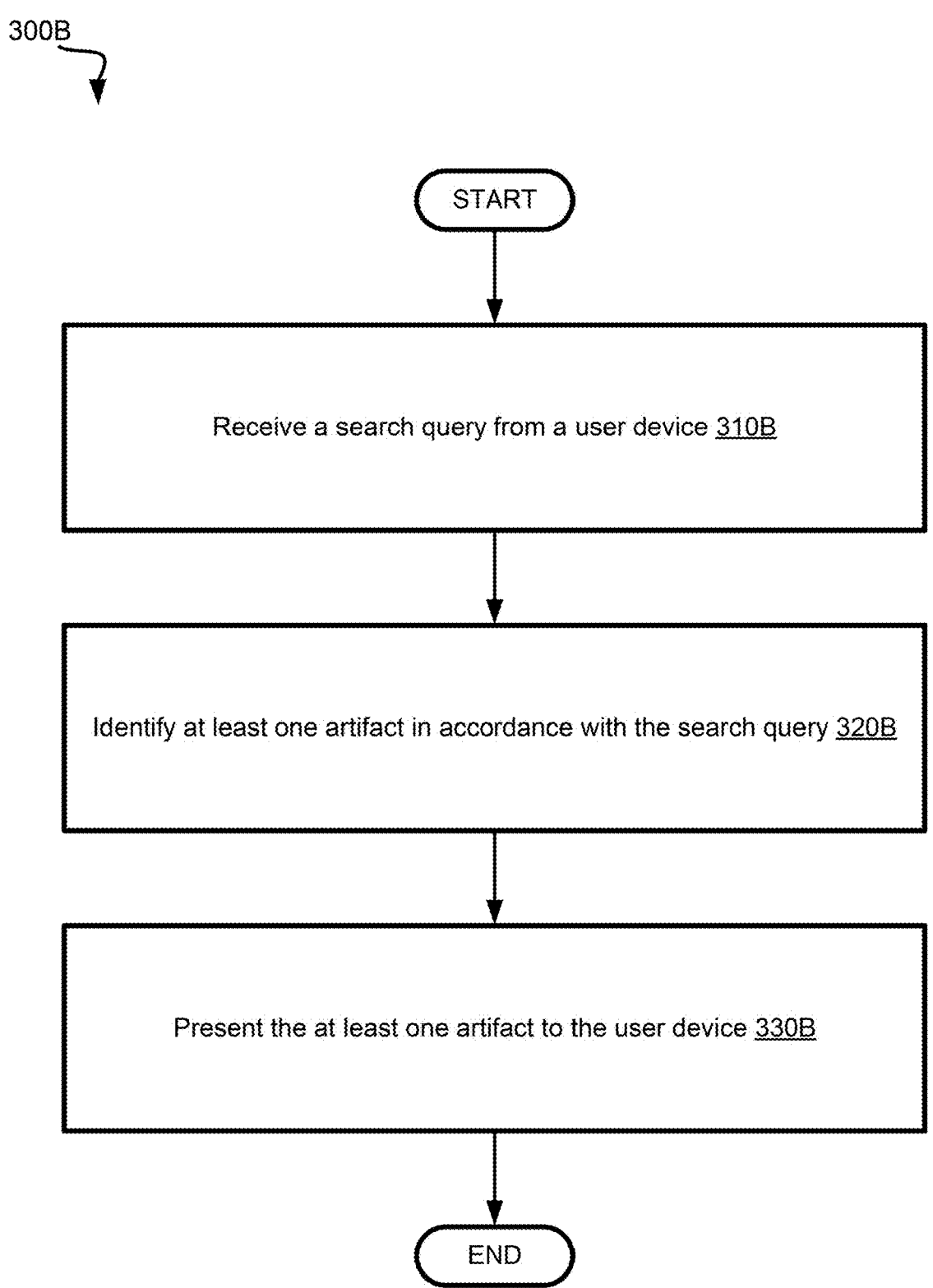
FIG. 3B is a flow diagram of an example method to search for artifacts within an enterprise network, in accordance with some implementations of the present disclosure.

FIG. 3B is a flow diagram of an example method 300B to search for artifacts within an enterprise network, in accordance with some implementations of the present disclosure. Method 300B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 300B is performed by system 100C of FIG. 1C. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 310B, processing logic receives a search query from a client device. The client device can be included within an enterprise network. The search query can be used to locate any relevant searchable artifacts ("artifacts") representing enterprise information items associated with (e.g., generated by) one or more enterprise network sources. The search query can be submitted by a user of the client device.

More specifically, the user can have a user account within the enterprise network, and the user can be logged into the user account prior to submitting the search query. The search query can include a string of characters. For example, the search query can include at least one keyword.

At operation 320B, processing logic identifies at least one artifact in accordance with the search query. An artifact can have associated metadata. In some embodiments, metadata includes one or more tags. Examples of metadata include title metadata, description metadata, keyword metadata, author metadata, enterprise group metadata, etc. Additionally, an artifact can have rating metadata indicating popularity of the enterprise information item (e.g., data indicative of a number of "likes" that the enterprise information item has received from users of the enterprise network).

At operation 330B, processing logic presents the at least one artifact to the client device. For example, processing logic can cause the artifact to be displayed on the client device via a graphical user interface (GUI). Each artifact is a respective search result of the search query. For example, each search result can display a title, description, author(s), keywords (e.g., keyword tags). The user of the client device can look through each search result (artifact) that has been presented and determine which search results, if any, are relevant. For example, the GUI can provide a mechanism for the user to save a search result (e.g., "favorite" or "bookmark" the search result). As another example, the GUI can provide a mechanism for the user to delete a search result that the user does not find relevant. As yet another example, the GUI can provide a mechanism for the user to edit a search result. For example, the user may need to be authorized or otherwise granted permission to edit the search result (e.g., the user may be granted an individual authorization or may be included within a group that has group authorization). The GUI can provide a mechanism for the user to filter the search results. For example, the GUI can enable the user to filter by one or more of: date of creation (e.g., in ascending or descending order), keyword or category, enterprise component that created the enterprise information item, author, rating. The GUI can provide different visualization options for displaying the search results. For example, the GUI can provide different size options, layout options, etc.

In some implementations, the GUI can be used to organize artifacts into one or more collections of artifacts. A user ca search for artifacts through a collection. For example, a collection can be a personal or private collection for the user (e.g., a collection of saved search results). As another example, a collection can be a public collection of artifacts. A public collection can have a title that indicates the type of artifacts included within the collection. For example, an "enterprise network health" collection can include artifacts that have metadata indicating relevance to enterprise network health (e.g., title or keyword). In some implementations, receiving the search query includes receiving a search query with respect to a collection. That is, the GUI can enable a user to search for artifacts within a collection to further refine the search results. Further details regarding GUI will now be described below with reference to FIGS. 4-5B.

Figure 4:
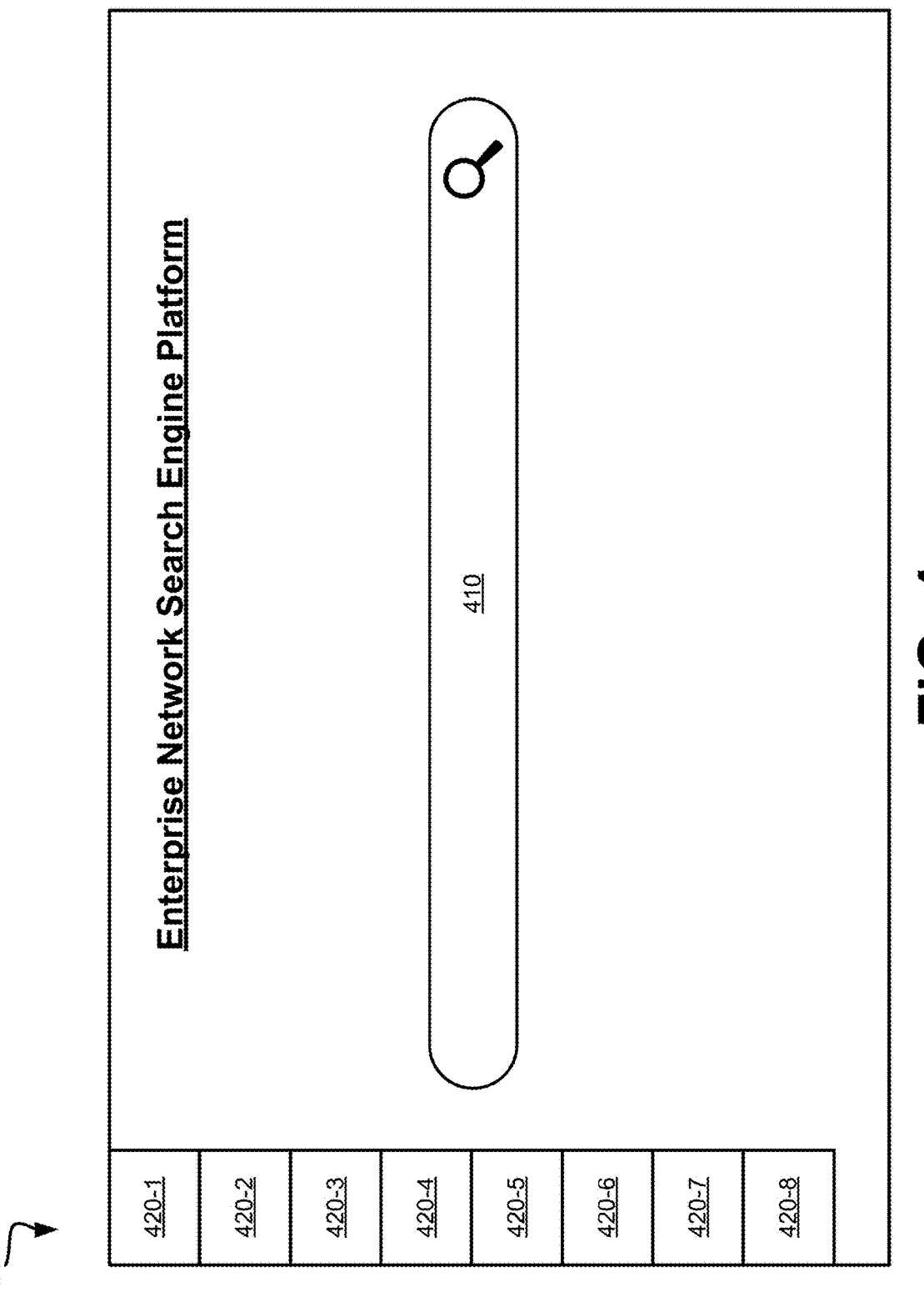
FIGS. 4-5B are diagrams of example graphical user interfaces (GUIs), in accordance with some implementations of the present disclosure.

FIG. 4 is a diagram of an example GUI 400 for locating and managing enterprise information item within an enterprise network, in accordance with some implementations of the present disclosure. More specifically, GUI 400 illustrates a homepage of an enterprise network system visible to a user via a client device. As shown, GUI 400 can include search bar 410 and a set of buttons including buttons 420-1 through 420-8. Search bar 410 can receive a search query. In response to receiving the search query, the enterprise network system can identify any artifacts that satisfy the search query. The enterprise network system can present, to client device, any artifacts that are identified, as will be described in further detail below with reference to FIGS. 5A-5B.

The set of buttons including buttons 420-1 through 420-8 can, in response to being triggered by the user (e.g., clicked on by the user or touched by the user), perform a respective action. For example, button 420-1 can be a home button that can display the homepage for the enterprise system. Button 420-2 can be a saved artifact button that can display a list of artifacts saved by the user (e.g., favorited by the user). Button 420-3 can be an artifact management button that can enable the user to manage artifacts. Button 420-4 can be a private collections button that can display a list of artifacts added to the user's private collection (e.g., saved or favorited by the user). For example, the list of collections added to the user's private collection can be a hierarchical tree list, a drop-down list, etc. Button 420-5 can be a public collections button that can display a list of public collections each including a set of artifacts that has been made publicly available by one or more groups within the enterprise network. For example, the list of public collections can be a hierarchical tree list, a drop-down list, etc. Button 420-6 can be a help button to provide technical assistance to the user (e.g., a frequently asked question (FAQ) button to display a FAQ page). Button 420-7 can be a communication button to enable the user to contact a help entity (e.g., administrator or other authorized person) via electronic message (e.g., email). Button 420-8 can be a logout button to log the user out of the corresponding user account.

Figure 5A:
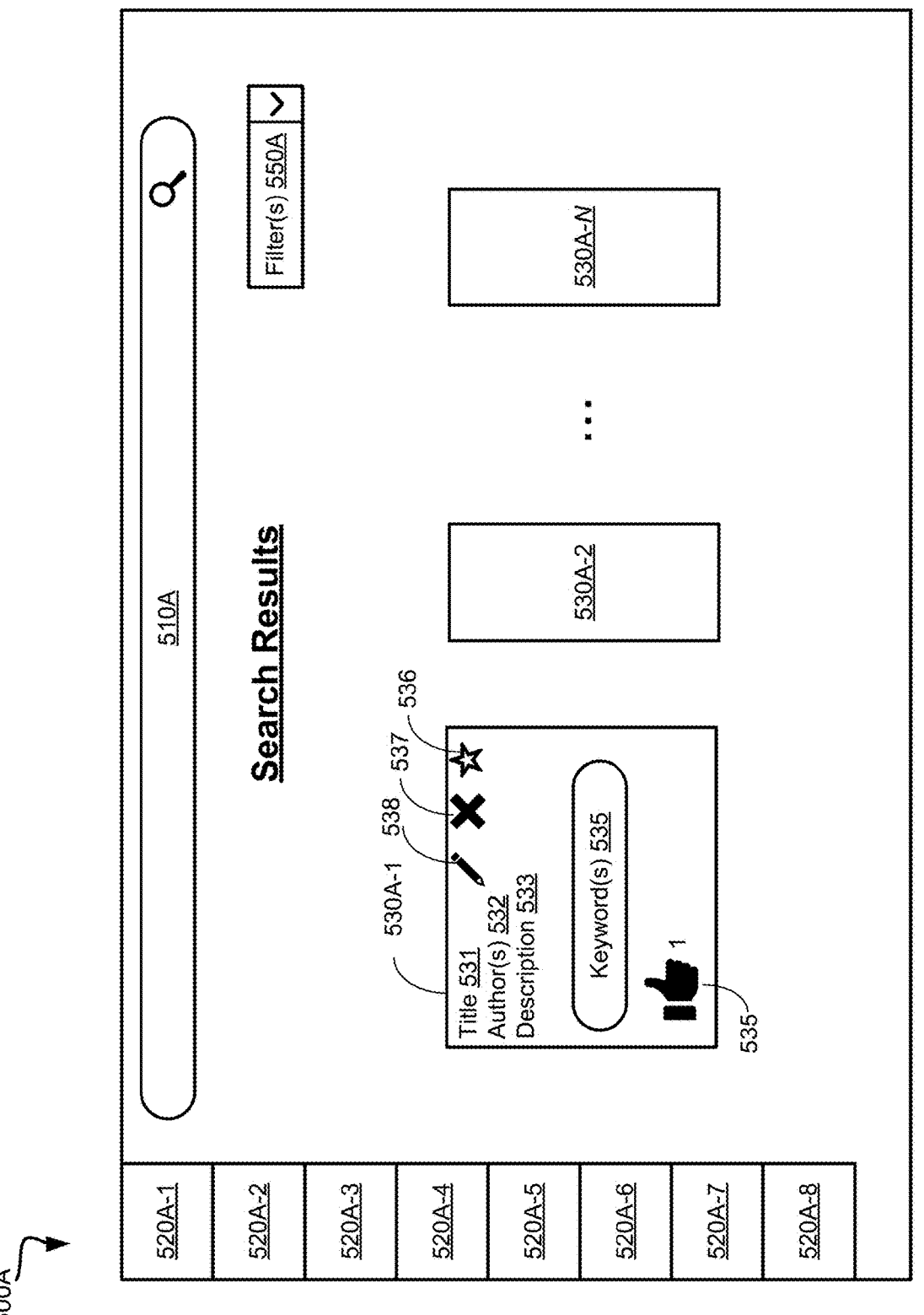

FIG. 5A is a diagram of an example GUI 500A, in accordance with some implementations of the present disclosure. More specifically, GUI 500A displays search results generated after receiving a search query (e.g., entered via search bar 410 of FIG. 4). As shown, GUI 500A includes search bar 510A, a set of buttons including buttons 520A-1 through 520A-8, search results 530A-1 through 530A-N, and one or more filters 540A. Buttons 520A-1 through 520A-8 can be similar to buttons 420-1 through 420-8 described above with reference to FIG. 4. Search bar 510A can receive a search query to search among search results 530A-1 through 530A-N (i.e., a refined search). Filter(s) 540A can be used to filter by one or more of: date of creation (e.g., in ascending or descending order), keyword or category, enterprise component that created the enterprise information item, author, rating.

Each of the search results 530A-1 through 530A-N can display metadata corresponding to the respective one of the search results 530A-1 through 530A-N. For example, search result 530A-1 can display title 531 indicating the title of the artifact corresponding to search result 530A-1, author(s) 532 indicating the one or more authors (i.e., creators) of the enterprise information item represented by the artifact corresponding to search result 530A-1, description 433 providing a brief description of the enterprise information item represented by the artifact corresponding to search result 530A-1, keyword(s) 534 indicating one or more keywords assigned (e.g., tagged) to the artifact corresponding to search result 530A-1, and rating 535 indicating popularity of the artifact corresponding to search result 530A-1. In this illustrative example, rating 535 is displayed as a number of "likes" that the artifact corresponding to search result 530A-1 has received from users of the enterprise network.

Each of the search results 530A-1 through 530A-N can implement a corresponding set of functions. For example, save function 536 that can enable a user to save (e.g., favorite) the artifact corresponding to search result 530A-1 within a list of search results saved by the user. As another example, delete function 537 that can enable a user to remove the search result 530A-1 from the list of search results. As yet another example, edit function 538 that can enable a user to edit the artifact corresponding to search result 530A-1.

Figure 5B:
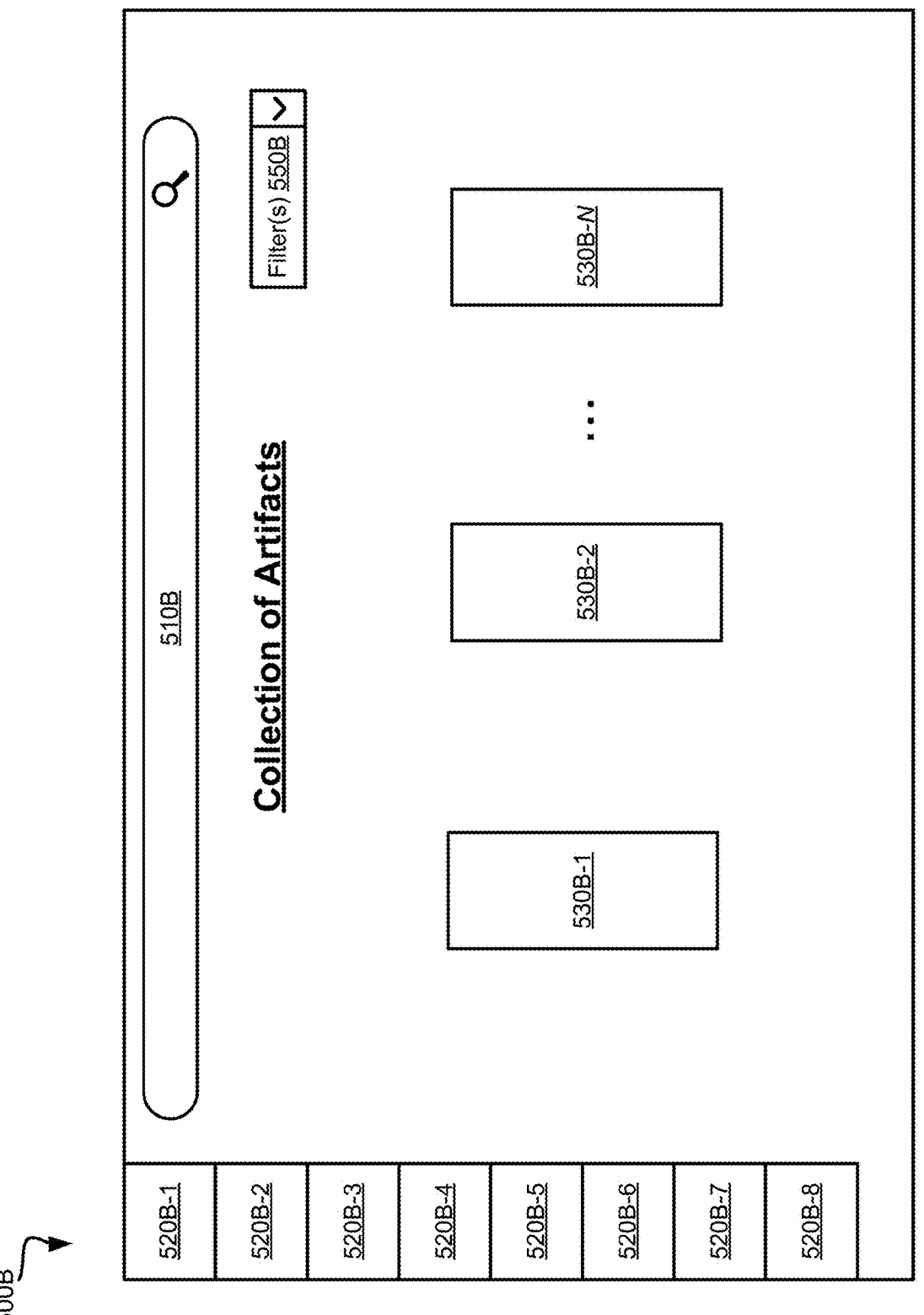

FIG. 5B is a diagram of an example GUI 500B, in accordance with some implementations of the present disclosure. More specifically, GUI 500B displays a collection of artifacts (e.g., a private collection of a user or a public collection). As shown, GUI 500B includes search bar 510B, a set of buttons including buttons 520B-1 through 520B-8, search results 530B-1 through 530B-N, and one or more filters 540B. Search bar 510B, the set of buttons including buttons 520B-1 through 520B-8 and one or more filters 540B are similar to search bar 510A, the set of buttons including buttons 520A-1 through 520A-8 and one or more filters 540A described above with reference to FIG. 5A. Search results 530B-1 through 530B-N correspond to respective artifacts assigned to the collection. For example, if the collection is a private collection, then search results 530B-1 through 530B-N can correspond to respective artifacts saved to the private collection by the user. As another example, if the collection is a public collection, then search results 530B-1 through 530B-N can corresponding to respective artifacts saved to the public collection by one or more users of the enterprise.

Figure 6:
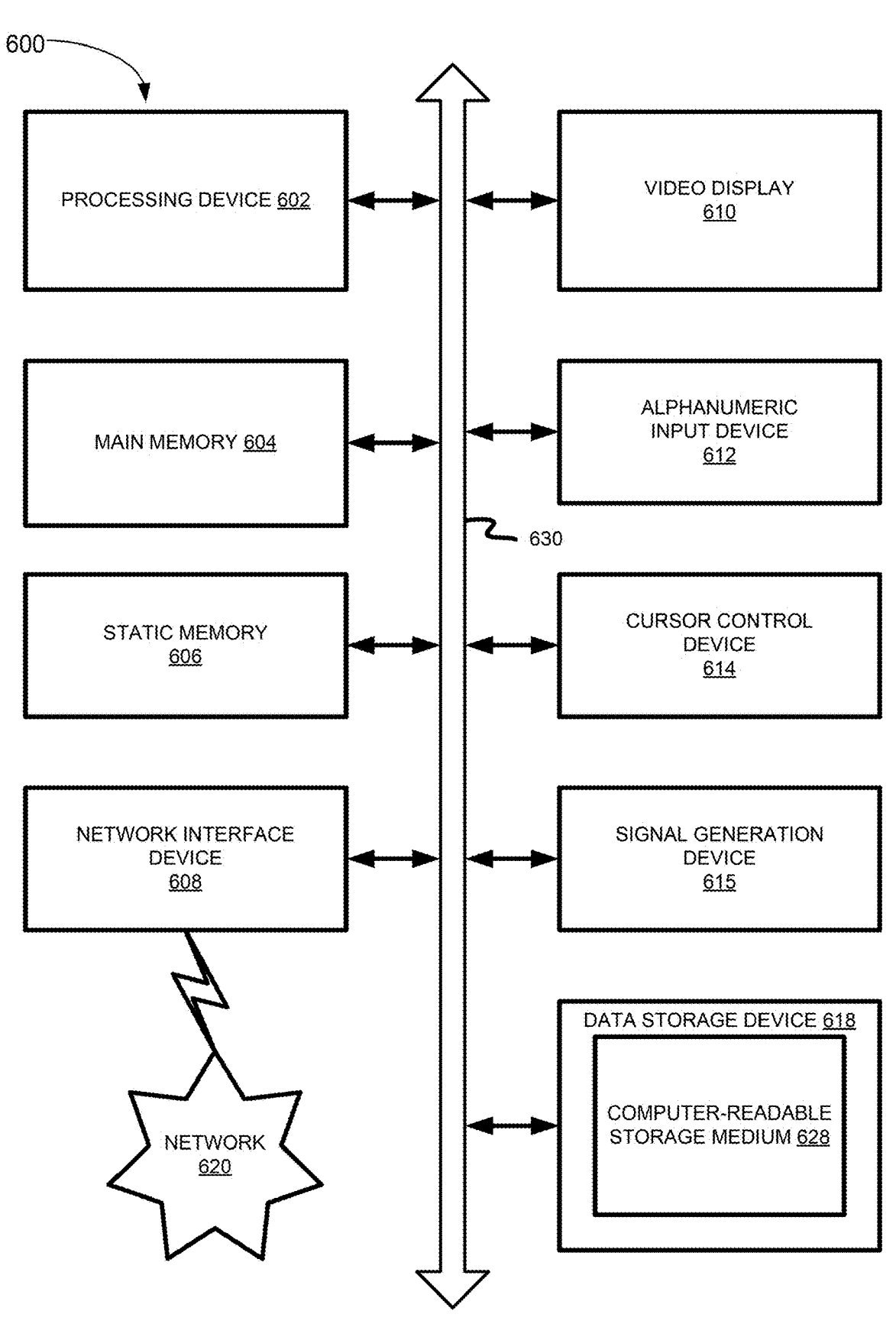
FIG. 6 is a block diagram of an example computer system in which implementations of the present disclosure may operate.

FIG. 6 illustrates a diagrammatic representation of a computer system 600, which may be employed for implementing the methods described herein. The computer system 600 may be connected to other computing devices in a LAN, an intranet, an extranet, and/or the Internet. The computer system 600 may operate in the capacity of a server machine in a client-server network environment. The computer system 600 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 600 may represent one or more servers of a distributed computer system implementing the above-described method 300 of FIG. 3.

The example computer system 600 may include a processing device 602, a main memory 604 (e.g., synchronous dynamic random access memory (DRAM), read-only memory (ROM)), and a static memory 605 (e.g., flash memory and a data storage device 618), which may communicate with each other via a bus 630.

The processing device 602 may be provided by one or more general-purpose processing devices such as a microprocessor, central processing unit, or the like. In an illustrative example, the processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 302 may also comprise one or more special-purpose processing devices such as an application specific integrated circuit (ASIC), a field programmable gate array (FPGA), a digital signal processor (DSP), a network processor, or the like. The processing device 602 may be configured to execute the methods of automated review of communications, in accordance with one or more aspects of the present disclosure.

The computer system 600 may further include a network interface device 608, which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and/or an acoustic signal generation device 615 (e.g., a speaker). In one embodiment, video display unit 610, alphanumeric input device 612, and cursor control device 614 may be combined into a single component or device (e.g., an LCD touch screen).

The data storage device 618 may include a computer-readable storage medium 628 on which may be stored one or more sets of instructions (e.g., instructions of the methods of automated review of communications, in accordance with one or more aspects of the present disclosure) implementing any one or more of the methods or functions described herein. The instructions may also reside, completely or at least partially, within main memory 604 and/or within processing device 602 during execution thereof by computer system 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" shall be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that causes the machine to perform the methods described herein. The term "computer-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such enterprise information item storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing enterprise information item in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:

receiving, by a processing device, a metadata rule template for extracting a first enterprise information item generated by a first enterprise application of an enterprise system, wherein the first enterprise information item has an initial data format different from at least a second initial data format of a second enterprise information item generated by a second enterprise application of the enterprise system, wherein the first enterprise information item is stored in a first source of a plurality of sources, wherein the second enterprise information item is stored in a second source of the plurality of sources, and wherein the metadata rule template specifies a set of parameters comprising at least one identifier of a location of the first enterprise information item within the plurality of sources;

causing, by the processing device, the first enterprise information item to be retrieved from the first source in accordance with the metadata rule template;

converting the initial data format of the first enterprise information item into a predefined data format specified by the enterprise system to enable searching across the plurality of sources;

generating, by the processing device based on the predefined data format of the first enterprise information item, a searchable artifact representing the first enterprise information item, wherein the searchable artifact comprises metadata representing a set of keywords; and storing, by the processing device, the searchable artifact within an artifact store.

2. The method of claim 1, wherein the searchable artifact comprises a title and a description of the first enterprise information item.

3. The method of claim 1, wherein generating the searchable artifact comprises identifying the set of keywords based on the first enterprise information item.

4. The method of claim 1, wherein generating the searchable artifact further comprises:

retrieving a parsing configuration from a template store; and causing a data parser to parse the first enterprise information item, wherein the data parser comprises a decoder corresponding to the initial data format.

5. The method of claim 1, further comprising:

receiving, by the processing device from a user device, a search query having a string of characters comprising at least one keyword of the set of keywords; and causing, by the processing device, the searchable artifact to be presented to the user device in satisfaction of the search query.

6. The method of claim 1, further comprising generating, by the processing device, at least one collection of enterprise information items comprising the searchable artifact.

7. A system comprising:

a memory; and a processing device, operatively coupled to the memory, to perform operations comprising:

receiving a metadata rule template for extracting a first enterprise information item generated by a first enterprise application of an enterprise system, wherein the first enterprise information item has an initial data format different from at least a second initial data format of a second enterprise information item generated by a second enterprise application of the enterprise system, wherein the first enterprise information item is stored in a first source of a plurality of sources, wherein the second enterprise information item is stored in a second source of the plurality of sources, and wherein the metadata rule template specifies a set of parameters comprising at least one identifier of a location of the first enterprise information item within the plurality of sources;

causing the first enterprise information item to be retrieved from the first source in accordance with the metadata rule template;

converting the initial data format of the first enterprise information item into a predefined data format specified by the enterprise system to enable searching across the plurality of sources;

generating a searchable artifact representing the first enterprise information item, wherein the searchable artifact comprises metadata representing a set of keywords; and storing, by the processing device, the searchable artifact within an artifact store.

8. The system of claim 7, wherein the searchable artifact comprises a title and a description of the first enterprise information item.

9. The system of claim 7, wherein generating the searchable artifact comprises identifying the set of keywords based on the first enterprise information item.

10. The system of claim 7, wherein generating the searchable artifact further comprises:

retrieving a parsing configuration from a template store; and causing a data parser to parse the first enterprise information item, wherein the data parser comprises a decoder corresponding to the initial data format.

11. The system of claim 7, wherein the operations further comprise:

receiving, from a user device, a search query having a string of characters comprising at least one keyword of the set of keywords; and causing at least the searchable artifact to be presented to the user device in satisfaction of the search query.

12. The system of claim 7, wherein the operations further comprise generating at least one collection of enterprise information items comprising the searchable artifact.

13. A system comprising:

a memory; and a processing device, operatively coupled to the memory, to perform operations comprising:

receiving, from a user device, a search request to retrieve one or more searchable artifacts;

identifying a set of keywords from the search request;

generating a search query based on the set of keywords;

identifying, from a source of a plurality of sources of an enterprise system, in accordance with the search query, a searchable artifact representing an enterprise information item associated with at least one enterprise application of the enterprise system, wherein the searchable artifact comprises metadata representing the set of keywords, and wherein the searchable artifact is generated based on a predefined data format specified by the enterprise system to enable searching of the searchable artifact across the plurality of sources; and causing the searchable artifact to be presented to the user device.

14. The system of claim 13, wherein the searchable artifact comprises a title and a description of the enterprise information item.

15. The system of claim 13, further comprising:

receiving a metadata rule template for extracting the enterprise information item from the at least one enterprise application;

causing the enterprise information item to be extracted from the at least one enterprise application in accordance with the metadata rule template;

identifying the set of keywords based on the enterprise information item; and generating the searchable artifact based on the set of keywords.

16. The system of claim 15, wherein generating the searchable artifact further comprises converting, into a predefined data format, an initial data format of the enterprise information item.

17. The system of claim 16, wherein processing the enterprise information item further comprises:

retrieving a parsing configuration from a template store; and causing a data parser to parse the enterprise information item to generate the processed enterprise information item, wherein the data parser comprises a decoder corresponding to the initial data format.

18. The system of claim 13, wherein the operations further comprise generating at least one collection of enterprise information items comprising the searchable artifact.

* * * * *